Nov. 30, 1965  C. B. ASKE, JR  3,220,775
WHEEL AND TIRE TRIM CONSTRUCTION
Filed May 27, 1964
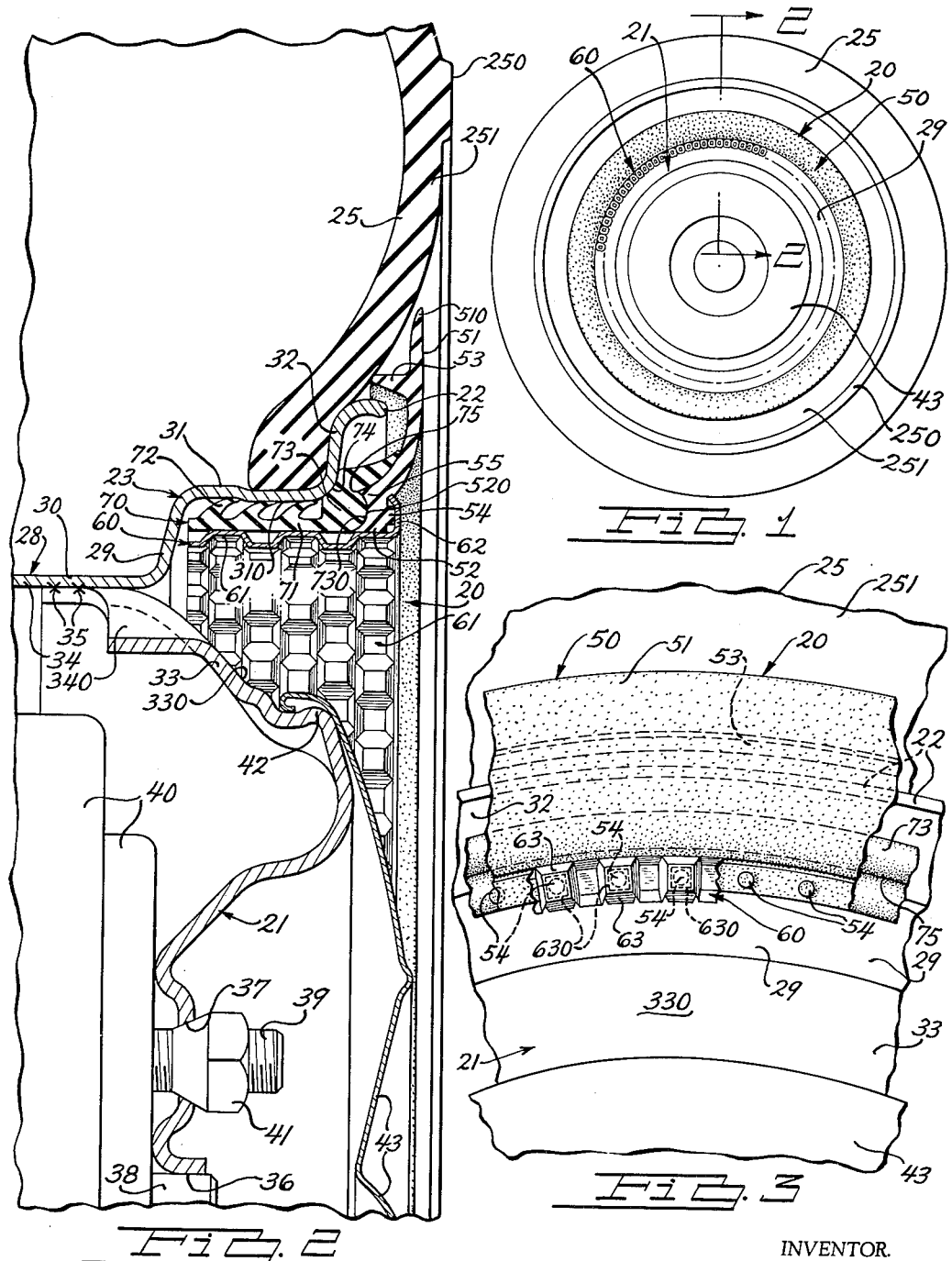
INVENTOR.
CHARLES B. ASKE JR.
BY
Everett G. Wright,
ATTORNEY United States Patent Office 3,220,775
Patented Nov. 30, 1965

3,220,775
WHEEL AND TIRE TRIM CONSTRUCTION
Charles B. Aske, Jr., Birmingham, Mich., assignor, by direct and mesne assignments, to Gar Wood Industries, Inc., a corporation of Michigan
Filed May 27, 1964, Ser. No. 370,437
3 Claims. (Cl. 301—37)

This invention relates to improved wheel and tire trim construction which provides a highly desirable and economical wheel and tire trim for automotive vehicles.

The primary object of the instant invention is to provide an improved, neat and effective wheel and tire trim construction for automotive vehicles wherein the wheel trim element, tire trim element and anchorage means cooperate in the firm securement of the wheel and tire trim to a vehicle wheel rim.

Another object of the invention is to provide a wheel and tire trim construction comprising a generally radially disposed tire trim element, a generally axially disposed annular anchorage element including resilient circumferential anchorage teeth and a combined locator, spacer and dovetail flange, and a wheel trim element, said tire trim element having an integral inner annular anchorage bead formed on its annular axial inner side to dovetail with the locator, spacer and dovetail flange of said anchorage element, axially disposed buttons formed on the axial outer side of the inner annular anchorage flange of said tire trim element, said wheel trim element including an axially disposed sleeve element over which said anchorage and tire trim elements are telescoped and sized, and a radially disposed axially outer annular flange on said wheel trim element formed to overlie said anchorage buttons and hold said tire trim and anchorage elements into firm engagement with respect to each other and the vehicle wheel rim when the vehicle wheel and tire trim and anchorage element are assembled and the assembly is mounted on a vehicle wheel.

Other objects of the invention will become apparent by reference to the following detailed description taken in connection with the accompanying drawings in which:

FIG. 1 is a side elevational view of a vehicle wheel and tire having mounted thereon vehicle wheel and tire trim of the invention.

FIG. 2 is an enlarged fragmentary sectional view taken on the line 2—2 of FIG. 1.

FIG. 3 is an enlarged fragmentary elevational view of the wheel and tire trim of FIGS. 1 and 2.

Referring now to the drawings wherein like reference characters refer to like corresponding parts throughout the several views, the particular embodiment of the invention disclosed consists of a vehicle wheel and tie trim assembly generally designated by the numeral 20 which consists of three major elements readily assembled into an effective unitary whole and mounted firmly and accurately on a vehicle wheel 21 having a tubeless or other tire 25 thereon.

The said vehicle wheel 21 has a drop center rim 23 composed of a central channel or drop center 28 having side walls 29 and a base 30. An annular tire bead seat 31 extends laterally outwardly from each side of the side walls 29 of the drop center 28, each said tire bead seat 31 terminating in a tire bead seat flange 32 extending radially therefrom which is axially outwardly curved at its upper portion to form an axially disposed outer lip 22. The said tire bead seat flange 32 is ofttimes referred to as the wheel flange and the said lip 22 is ofttimes referred to as the lip of the wheel rim. Within the drop center rim 23 is a wheel spider 33 having an axially disposed flange 34 which is secured to the central channel 28 of the drop center rim 23 by such means as welding at 35. The said wheel spider 33 is provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide brake drum ventilation and added structural strength to the vehicle wheel 21. The spider 33 is generally formed with an annular axially outwardly extending collar 330 which is preferably provided with a plurality of hub cap retainer nubs 42 over which a conventional hub cap 43 is sprung for securement onto the vehicle wheel 21. The said spider collar 330 has an annular exposed painted surface extending from the outer periphery of the hub cap 43 to the drop center wheel rim 23, which also has its exposed surfaces painted. The particular tire 25 illustrated in the drawings is a modern tubeless tire having a scuff bead 250 extending from its side wall 251. The said tubeless tire 25, when used on the vehicle wheel 21, requires a valve stem (not shown) mounted in sealed relationship through a suitable valve stem aperture (not shown) provided in the outer wall 29 of the drop center rim channel 28 of the rim 23 of the said wheel 21.

The particular embodiment of the wheel and tire trim assembly 20 disclosed herein for illustrative purposes consists of three elements; namely, an annular tire trim element 50 consisting of a generally radially disposed tire trim or side wall portion 51 and integral therewith an inner annular anchorage bead portion 52, a generally axially disposed annular metal wheel trim element 60 including an annular axially disposed sleeve portion 61 and a circumferential generally radially disposed axially outer bull nose portion 62, and a generally axially disposed annular anchorage element 70 including a toothed anchorage portion 71 having resilient circumferential axially spaced anchorage teeth 72 and an axially outer combined spacer, locator and dovetail flange 73, all of which are assembled into the wheel and tire trim assembly 20 prior to mounting it on a vehicle wheel 21 with the toothed anchorage portion 71 thereof telescoped within the tire bead seat annulus 310 of the said vehicle wheel 21 as best shown in FIG. 2. The said annular metal wheel trim element 60 is of the proper annular form to accurately size the annular tire element 50 and the annular anchorage element 70 when assembled in telescopic relationship over the sleeve portion 61 thereof and axially against the flange or bull nose portion 62 thereof to form the wheel and tire trim assembly 20.

The tire trim element 50 is preferably formed of rubber; however, it may be molded of other suitable resilient material such as butyl or other artificial rubber compounds. The tire trim element 50 may be of any suitable color, but white is generally preferred with a black side wall tire 25. Colors other than white are preferably employed with white side wall tires to provide a color stripe effect. The said tire trim element 50 includes a somewhat accurate generally radially disposed annular tire trim or side wall portion 51 which, if the tire trim is formed of resilient rubber, is preferably provided with an annular axially rearwardly extending rib 53 of such an axial depth as to hold the outer peripheral portion 510 of the side wall portion 51 of the said tire trim element 50 spaced from the side wall 251 of the tire 25 when the wheel and tire trim assembly 20 is mounted on a vehicle wheel 21. This prevents bleed-through of carbon black from the tire 25 to the side wall portion 51 of a white natural rubber tire trim element 50. At the inner periphery of the annular side wall portion 51 of the tire trim element 50 is an inner annular anchorage bead portion 52 formed to provide a plurality of axially outwardly extending circumferentially spaced anchorage buttons 54. The said annular anchorage bead portion 52 is concaved at 520 at its axially inner periphery to conform to the axially outer annular bulbous portion 730 of the combined spacer, locator and dovetail flange 73.

The said anchorage element 70 is provided at its anchorage portion 71 with a plurality of circumferential axially spaced resilient anchorage teeth 72 disposed radially outwardly therefrom and preferably formed triangular in cross section to readily flex axially outwardly when a wheel and tire trim assembly 20 is mounted on a vehicle wheel with the toothed anchorage portion 71 of the tire trim element 50 disposed within the said inner annulus 310 of the tire bead seat 31 of the vehicle wheel 21 as best shown in FIG. 2.

The axially inner portion of the combined spacer, locator and dovetail flange 73 of the annular anchorage element 70 is formed to provide a suitable seat 74 which seats against the juncture of the annular tire bead seat 31 and the annular tire bead seat flange 32 of the annular tire bead seat 31 and the tire bead seat flange 32 of the drop center rim 23 of the vehicle wheel 21 when the vehicle wheel and tire trim assembly 20 is mounted thereon. This positions the said vehicle wheel and tire trim assembly 20 properly on a vehicle wheel 21.

The juncture between the side wall portion 51 and the inner annular anchorage bead portion 52 on the axially inner side of the annular tire trim element 50 forms an axially inwardly extending annular rib 55 which dovetails into a complementary annular groove 75 formed in the axial outer periphery of the combined spacer, locator and dovetail flange 73.

The axially outer annular bulbous portion 730 of the said combined spacer, locator and dovetail flange 73 abuts both the tire bead seat flange 32 of the wheel rim 23 and the axially inner annular face 511 of the side wall portion 51 of the tire trim element 50 to aid the said combined spacer, locator and dovetail flange 73 in spacing and locating the said side wall portion 51 of the tire trim element 50 in respect to the said tire bead seat flange 32 of the wheel rim 23 and the lip 22 of the said wheel rim 23. This relieves most of the axial pressure of the axially rearwardly extending rib 53 of a natural rubber white side wall tire trim element 50 against the wall 250 of the tire 25.

Although not shown in the drawings, it is obvious that when the axially rearwardly extending rib 53 is omitted, as when butyl or other synthetic rubber is employed for the tire trim element 50, the curvature to which the side wall portion 51 of the said tire trim element is formed causes it to flex at its outer peripheral portion 510 against the wall 250 of the tire 25. Therefore, when colored butyl or other synthetic tire trim element 50 is employed, the said combined spacer, locator and dovetail flange 73 of the annular anchorage element 70 relieves most of the pressure of the outer peripheral portion 510 of the side wall portion 51 of the annular tire trim element 50 against the side wall 251 of the tire 25 when the said axially rearwardly extending rib 53 is omitted.

The wheel trim element 60 is annularly formed of an ornamental strip of stainless steel or the like and consists of an annular axially disposed sleeve portion 61 and a generally radially disposed annular bull nose or anchorage flange portion 62 at the axial outer periphery of the said sleeve portion 61. The wheel trim element 60 is preferably ornamented with a plurality of axially spaced rows of circumferentially spaced protuberances 63 which provide, at least along the bull nose or anchorage flange portion 62 thereof, a row of axially inwardly disposed pockets 630 which encompass or register over the suitably spaced nibs or buttons 54 extending axially outwardly from the axially outer face of the inner annular anchorage bead portion 52 of the tire trim element 50. The annular bull nose or anchorage portion 62 of the wheel trim element 60 and the interlocking of the nibs or buttons 54 of the bead portion 52 of the tire trim element 50 within the said pockets 630 formed in the said annular bull nose or anchorage portion 62 of the wheel trim element 60 provides efficient and reliable anchorage means for holding the tire trim element 50 in place in the wheel and tire trim assembly 20 when mounted on the vehicle wheel 21 as shown in FIGS. 1, 2 and 3.

The hereinbefore described construction not only provides a most effective improved wheel and tire trim for vehicle wheels, but permits the furnishing of several styles of wheel trim with the use of two common parts, namely the wheel trim element 60 and the anchorage element 70, and by giving the customer or user a choice of white side wall tire trim or color side wall tire trim 50. Of additional great value is the novel interlocking and anchorage features employed which assures the maintenance of the wheel and tire trim assembly 20 into the equivalent of a unitary structure when mounted on the vehicle wheel, and which positively prevents ratcheting of the tire trim element in respect to the tire trim element when said wheel and tire trim assembly are mounted on a vehicle wheel; the tendency toward such ratcheting being caused by fast starts and quick stops of the motor vehicle.

Although but a single embodiment of the invention and certain modifications thereof have been disclosed and described, it is obvious that many changes may be made in the size, shape, arrangement and detail of the several elements of the invention without departing from the spirit and scope thereof as defined by the appended claims.

I claim:

1. A wheel and tire trim assembly for vehicle wheels including a rim having a tire bead seat forming an axially outwardly disposed tire bead seat annulus, a tire bead seat flange radially extending from said tire bead seat and terminating in an axially outwardly extending lip, and a tire mounted on said rim; said wheel and tire trim assembly comprising an annular wheel trim element including an axially disposed annular sleeve portion somewhat smaller in diameter than the said tire bead seat annulus and an axially outer radially disposed bull nose portion, an annular tire trim element including an arcuate side wall portion and an inner annular anchorage bead, an annular generally axially disposed anchorage element including an annular axially inwardly disposed base portion, a plurality of circumferential generally triangular axially spaced radially extending flexible anchorage teeth on said base portion, and an annular outer combined spacer, locator and dovetail flange portion extending axially and radially outwardly from said base portion, said combined spacer and anchorage flange portion of said anchorage element having an axially outer annular bulbous portion including an axially inner annular seat located to abut against the juncture of the tire bead seat flange and the tire bead seat annulus of said wheel rim when the wheel and tire trim assembly is mounted on a vehicle wheel, said tire trim element and said anchorage element being assembled in juxtaposed relationship on said wheel trim element with said tire trim element disposed in abutment with said bull nose portion of said wheel trim element, and circumferentially spaced anchorage buttons extending axially outwardly from the inner annular anchorage bead portion of said tire trim element, the axially outer radial bull nose portion of said annular wheel trim element overlying and engaging said axially disposed anchorage buttons when said tire trim element and said anchorage element are assembled on said wheel trim element and said assembly is mounted on said vehicle wheel with the toothed base portion of said anchorage element and the sleeve portion of said wheel trim element telescoped within said tire bead seat annulus.

2. A wheel and tire trim assembly for vehicle wheels as claimed in claim 1 wherein the bull nose portion of said wheel trim element is provided with a plurality of suitably spaced pockets encompassing said anchorage buttons.

3. A wheel and tire trim assembly for vehicle wheels including a rim having a tire bead seat forming an axially outwardly disposed tire bead seat annulus, a tire bead seat flange radially extending from said tire bead seat and terminating in an axially outwardly extending lip, and a tire mounted on said rim; said wheel and tire trim assembly comprising an annular wheel trim element including an axially disposed annular sleeve portion somewhat smaller in diameter than the said tire bead seat annulus and an axially outer radially disposed bull nose portion, an annular tire trim element including an arcuate side wall portion and an inner annular anchorage bead, means holding the outer peripheral portion of the side wall portion of said tire trim element spaced from the wall of said tire, an annular generally axially disposed anchorage element including an annular axially inwardly disposed base portion, a plurality of circumferential generally triangular axially spaced radially extending flexible anchorage teeth on said base portion, and an annular outer combined spacer, locator and dovetail flange portion extending axially and radially outwardly from said base portion, said combined spacer and anchorage flange portion of said anchorage element having an axially outer annular bulbous portion including an axially inner annular seat located to abut against the juncture of the tire bead seat and tire bead seat annulus of said wheel rim when the wheel and tire trim assembly is mounted on a vehicle wheel, the anchorage bead portion of said tire trim element and said anchorage element being complementarily formed for assembly in dovetailed interlocked relationship with respect to each other on said wheel trim element with said anchorage bead of said tire trim element disposed adjacent said bull nose of said wheel trim element, circumferentially spaced anchorage buttons extending axially outwardly from the inner annular anchorage bead portion of said tire trim element, the said axially outer radial bull nose portion of said annular wheel trim element having pockets formed therein overlying and engaging said axially disposed anchorage buttons when said tire trim element and said anchorage element are assembled on said wheel trim element, said wheel and tire trim assembly being mounted on said vehicle wheel with the toothed base portion of said anchorage element telescoped within said tire bead seat annulus.

References Cited by the Examiner
UNITED STATES PATENTS

| | | | |
|---|---|---|---|
| 2,963,325 | 12/1960 | Aske et al. | 301—37 |
| 2,964,354 | 12/1960 | Aske et al. | 301—37 |
| 2,996,334 | 8/1961 | Aske | 301—37 |
| 3,055,712 | 9/1962 | Shoemaker | 301—37 |
| 3,085,829 | 4/1963 | Barnes | 301—37 |

OTHER REFERENCES

American Motorist: October 1961, page 25.

BENJAMIN HERSH, *Primary Examiner.*